United States Patent [19]

Mercado

[11] Patent Number: 4,875,710
[45] Date of Patent: Oct. 24, 1989

[54] ABRASIVE THREADED FIBERGLASS PIPE JOINT

[75] Inventor: Hector P. Mercado, Wichita Falls, Tex.

[73] Assignee: Ameron, Inc., Monterey Park, Calif.

[21] Appl. No.: 147,526

[22] Filed: Jan. 25, 1988

[51] Int. Cl.⁴ ............................................. F16L 35/00
[52] U.S. Cl. .................................... 285/24; 285/40; 285/328; 285/355; 285/383; 285/423; 285/915; 411/908; 411/389
[58] Field of Search ................ 285/390, 423, 92, 915, 285/328, 40, 906, 355; 411/903, 908, 301, 389, 427, 429

[56] References Cited

U.S. PATENT DOCUMENTS

| | | |
|---|---|---|
| 1,562,675 | 11/1925 | Baker . |
| 2,346,051 | 4/1944 | Seamark ............................ 285/906 |
| 2,533,885 | 12/1950 | Hill . |
| 2,792,620 | 5/1957 | Kohring . |
| 2,943,967 | 7/1960 | Simon ............................... 285/390 |
| 3,059,697 | 10/1962 | Pitts ................................. 411/301 |
| 3,061,888 | 11/1962 | Wadham ....................... 411/908 X |
| 3,325,195 | 6/1967 | Margis ........................... 285/328 X |
| 3,381,715 | 5/1968 | Michael ......................... 285/423 X |
| 3,381,978 | 5/1968 | Faustini ............................ 285/40 |
| 3,476,409 | 11/1969 | Benteler et al. . |
| 3,508,773 | 4/1970 | Coberly et al. . |
| 3,593,410 | 7/1971 | Taylor . |
| 3,961,104 | 6/1976 | Tanner . |
| 4,121,862 | 10/1978 | Greer . |
| 4,568,113 | 2/1986 | Axford et al. ................. 285/390 X |

FOREIGN PATENT DOCUMENTS

| | | |
|---|---|---|
| 139631 | 1/1980 | Fed. Rep. of Germany ........ 285/40 |
| 0132933 | 8/1982 | Japan . |
| 1288648 | 9/1972 | United Kingdom ............... 285/328 |
| 2098692 | 11/1982 | United Kingdom ................ 285/40 |

Primary Examiner—Dave W. Arola
Attorney, Agent, or Firm—Christie, Parker & Hale

[57] ABSTRACT

A joint for joining together lengths of fiberglass reinforced pipe or assembling joint components to a length of fiberglass reinforced pipe has abrasive threads capable of cutting matching threads into the surface of the pipes being joined. The abrasive threaded coupling requires no shaving or other surface preparation of the pipes to be joined for assembly of the joint. If a bonding adhesive is used in the joint, the joint is not sensitive to and will not be damaged by the movement of the joint before the adhesive has cured. The abrasive threaded joint can be modified for use as a pipe coupling, fitting, flange, adapter or a quick and effective repair coupling.

13 Claims, 3 Drawing Sheets

ABRASIVE THREADED FIBERGLASS PIPE JOINT

FIELD OF THE INVENTION

The present invention is directed to a joint for joining together end-to-end lengths of fiberglass reinforced pipe, fitting, flanges or other adapters and, more particularly, to such a joint having abrasive threads capable of cutting matching threads into the outer diameter of a pipe when the component is torqued on.

BACKGROUND OF THE INVENTION

Since fiberglass reinforced pipe was introduced, various means have been tried for joining together end-to-end lengths of the pipe, fittings, flanges and adapters. These different means have met with varying degrees of success but none has been completely acceptable. Particular difficulty has been encountered in developing a joint that can be installed quickly and easily in the field when used for repair.

Some such prior means provide a purely mechanical joint between lengths of pipe. The ends of the pipe to be joined have matching threaded joint components. However, because the joint formed is purely mechanical, an 0-ring must be used between the pipe ends to prevent leaking. Thus, this type of coupling cannot be used in services where the materials carried by the pipe could attack the O-ring. This represents a limitation on the use of this type of coupling.

A number of prior means have been used that provide a bonded joint between lengths of pipe. The most common of these is the bell and spigot joint. This joint, as embodied by a female by female coupling has a cylindrical sleeve with an inner wall that tapers outwardly at a slight angle, about 1°45', from the mid point of the coupling toward both ends. To form the joint, the ends of the pipe to be joined must be shaved at their outer walls to have an inward taper toward the ends of the pipe that will match that of the coupling. Adhesive is then spread on the tapered surfaces of the pipe and coupling and the pipe ends inserted into the opposite ends of the coupling. It is very important that the tapers on the pipe and the coupling match closely. Otherwise, air will be trapped in the adhesive and the joint could fail at less than the rated pressure. It is also very important that the tapered surfaces be kept clean to avoid contamination in the joint that could cause it to fail. After assembly, the joint cannot be moved until the adhesive has cured. As embodied by a flange or adapter, this joint would have only one tapered end and accept only one pipe end. Performance characteristics would be identical.

Because of the need for close tolerance shaving, the need to avoid surface contamination, and the sensitivity to movement, the bell and spigot joint does not make a good field repair means. In addition, the integrity of the joint formed by this type of coupling is dependent upon the pipe ends being inserted tightly within the joint component. However, it can be very difficult to control pipe length so that a pipe end can be inserted tightly within a coupling, for example, especially in the repair context. To repair a broken or damaged pipe, a length of the pipe around the broken or damaged spot is cut through and removed. A replacement length of pipe is then joined to the remaining pipe at either end. If the length of this replacement section is too short, it will not fit tightly in the couplings at both ends. Thus, one of the repair joints may fail. It is very common for a replacement section to be short to facilitate positioning the section between the couplings.

Another bonded joint uses a configuration that has a straight socket and spigot arrangement. To form this joint, the ends of the pipe to be joined are shaved to create a squared-off indentation extending around the outer surface of the pipe at the ends of the pipe. Thus, cylindrical lengths having outside diameters less than that of the pipe are provided at the pipe ends. The to-be-bonded joint component has an inside diameter equal to that of the pipe and a bell with inside diameter capable of fitting over the shaved portions on the pipe ends. The inner walls of the bells may slightly taper outwardly toward their respective pipe ends. Adhesive is spread on 20 the inner wall of the bell and on the shaved pipe end and then the pipe end is inserted into the bell. The taper on the bell is provided to allow trapped air to escape from the adhesive when the pipe ends are inserted.

This joint suffers from most of the same problems encountered with the bell and spigot joint. The outer diameter of the pipe ends must be closely matched to the inner diameter of the bells or the joint will not be tight. Air can be trapped in the adhesive. Surface contamination must be avoided. Also, this joint is more sensitive to movement before the adhesive is cured than the bell and spigot joint. Control over pipe length, however, is more accurately measurable with this type of joint. Similar performance is found in straight socket joints not requiring shaving of the pipe end.

A joint has also been developed to form bonded joints that would not be as sensitive to movement before the adhesive has cured. This coupling has a cylindrical sleeve with an inner wall having a series of surfaces that taper outwardly toward both ends. These outwardly tapered surfaces are separated by axially extending surfaces so that the inner wall at each end of this coupling forms an outwardly tapered saw-tooth pattern. That is, the outwardly tapered surfaces at each end of the coupling are themselves arranged on an outward taper from the mid point of the coupling that is not as steep as their individual outward tapers. The ends of the pipe to be joined in this coupling are provided with inwardly tapered surfaces that will match the tapered surfaces of the coupling. The tapered surfaces of the coupling and the pipe ends are coated with adhesive and then the pipe ends inserted into opposite ends of the coupling.

Because the axially extending surfaces provide some mechanical locking between the pipe ends and the coupling, this joint is not as sensitive to movement before the adhesive cures. However, the tapered surfaces required on the pipe ends cannot currently be fabricated in the field and rotation of the pipe is required to assemble the joint. Thus, this joint cannot be used as a repair means. As with other bonded joints, surface contamination must be avoided. Also, as with the tapered bell and spigot configuration, the integrity of the joint formed by this means is dependent upon the pipe ends being inserted tightly within the coupling. Therefore, problems can arise with this joint if pipe length is not carefully controlled.

A joint has also been developed to allow the formation of a "no-shave" joint. That is, the bell component can be used directly with the pipe ends to be joined and no shaving of the pipe ends is required. This joint is similar to the straight socket and spigot, except that the inner diameter of the bell is large enough for the bell to fit over the outer diameter of the pipe. Adhesive is spread on the inner wall of the bell and on the outer surfaces of the pipe end and then the pipe end is inserted into the bell component. Although this joint does not require shaving, it has many disadvantages.

For "no shave" joints to be feasible, the outer diameter of the pipe has to be carefully controlled so that it will match the inner diameter of the bell. In addition, the wall thickness of the pipe has to be carefully controlled so that a uniform cylindrical surface is presented by the outer surface of the pipe adjacent the end. However, these variables can be very difficult to control in certain manufacturing processes used in making fiberglass reinforced pipe. Therefore, pipe made by these processes cannot be joined very well with "no shave" joints.

"No shave" joints are the most sensitive to movement before the adhesive has cured. Like other bonded joints, they can fail if air is trapped in the adhesive during the joining process or if surface contamination interferes with the adhesive. Irregularities in the thickness of the pipe at the ends can also lead to joint failure because gaps can occur between the outer wall of the pipe and the inner wall of the coupling bells.

Accordingly, a joint for connecting fiberglass reinforced pipe is needed that does not require shaving of the pipe or any other surface preparation for assembly, that is not sensitive to movement of the joint before any adhesive used with the joint has cured, that does not require the use of an 0-ring to prevent leaking, that does not trap air in any adhesive used with the joint during assembly which affects performance, and that is not sensitive to surface contamination. This joint should also be reusable, be capable of being formed quickly and accurately, and be capable of use in a repair coupling configuration.

Summary of the Invention

In accordance with the present invention, a fitting or joining means for attachment to a length of pipe having an internal and an external surface is provided. This means can be configured as a coupling for joining lengths of pipe together end-to-end, it can be used in any type of fitting, such as an elbow or a tee, or, in a flange or other type adapter used in connection with lengths of pipe. The fitting comprises a sleeve member having an internal and external surface and at least one end separating these surfaces, and abrasive threads provided in at least a portion of one of the surfaces of the sleeve member for engaging at least a portion of one of the surfaces of the length of pipe when the fitting is attached to the length of pipe.

In particularly preferred embodiments, the surface of the sleeve member in which the abrasive threads are provided is smooth adjacent the one end to assist in the alignment of the fitting and the length of pipe during attachment of the fitting to the length of pipe or has a rib extending outward therefrom at a point on said surface that is on the opposite side of the threads from the one end to control the degree of engagement between the fitting and the pipe length. Preferably, the height of the threads gradually increases to a constant height as the threads are located further away from the one end in the surface in which they are provided. Most preferably, the height of the threads increases to a constant height over about 2½ thread cycles.

The preferred composition for the abrasive threads is a mixture of a grit and a resin. The grit and the resin are mixed in a ratio of about 4 to 1 by respectively, in a particularly preferred embodiment. When the length of pipe is comprised of reinforced fiberglass, the grit is preferably comprised of aluminum oxide and the resin is preferably comprised of a similar resin to the pipe wall. The abrasive threads can be provided in the internal surface of the sleeve to engage the external surface of the length of pipe when the fitting is attached to the length of pipe or in the external surface of the sleeve to engage the internal surface of the length of pipe when the fitting is attached to the length of pipe.

A method for attaching a fitting to a length of pipe is also provided according to the present invention. This method comprises the steps of providing abrasive threads in at least a portion of a surface of the fitting, and bringing the abrasive threads into contact with a surface of the length of pipe so that threads are abraded into the surface of the length of pipe. The method can also comprise the step of spreading an adhesive material on the abrasive threads and the surface of the length of pipe before bringing the abrasive threads into contact with the surface of the length of pipe. In addition, the method can be used for joining at least two lengths of pipe together at a fitting.

DETAILED DISCLOSURE

Figure 1:
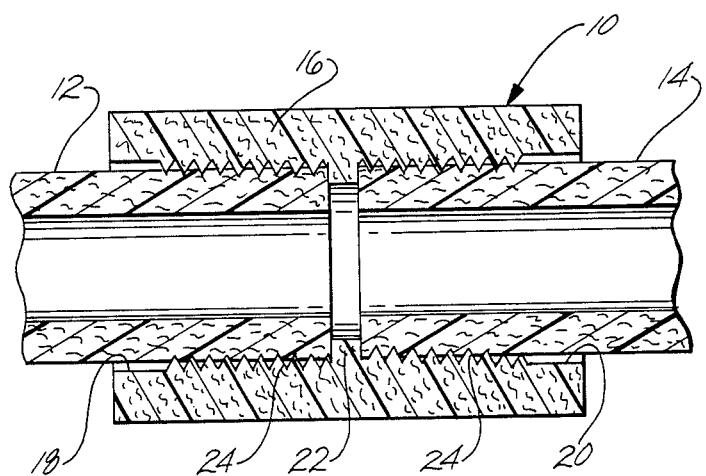
FIG. 1 is a cross-sectional side view of a coupling according to the present invention joining lengths of fiberglass reinforced pipe end to end.

With reference to FIG. 1, a straight, female by female coupling 10 is shown joining one length of fiberglass reinforced pipe 12 end to end with another length of fiberglass reinforced pipe 14. Although the preferred embodiment will be described with reference to a straight, female by female coupling, it should be understood that the present invention extends to a wide variety of coupling types. For example, other pipe fittings, such as elbows and tees, could advantageously apply the teaching of the present invention, as well as flanges and other adapters. Even pipe fittings having male connectors can make use of the present invention. The preferred embodiment will also be described in the context of fiberglass reinforced pipe because the present invention is expected to have extensive application in this area. However, it should be understood that the basic principles of the present invention can be applied to pipe made of many different materials.

Coupling 10 has an elongated cylindrical sleeve or wall 16 that is preferably made of fiberglass reinforced resin so that the coupling will share the desirable corrosion resistant properties of pipe lengths 12 and 14. The internal surface of wall 16 has bells 18 and 20 adjacent both ends of the coupling. These bells have a diameter that is preferably about 0.055 inches larger than the maximum outer diameters of pipe lengths 12 and 14. Bells 18 and 20 help to align lengths of pipe being inserted into the coupling. If desired, the bells can be provided with a slight inward taper from the ends of the coupling.

At the mid point of the coupling, the internal surface of wall 16 has a rib or pipe stop 22 that extends radially inward about the circumference of the internal surface. This pipe stop ensures that a pipe length inserted into the coupling will be inserted a predetermined distance and will leave the other half of the coupling for another pipe length to be inserted the same predetermined distance. Thus, the degree of engagement of a pipe length with the coupling can be controlled to be above a minimum acceptable level and failure of the joint due to unequal positioning of the pipe lengths in the coupling can be prevented.

Figure 4:
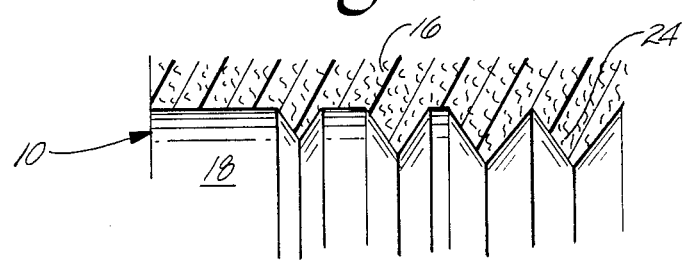
FIG. 4 is an enlarged, cross-sectional side view of a fragment of the coupling of FIG. 1 showing the thread start up.

Between each bell and the pipe stop cylindrical threads 24 are provided in the internal surface of wall 16. The height of the threads gradually increases to full height over the first 2½ thread revolutions beginning at the edge of the bells (FIG. 4). Threads 24 are abrasive so that when coupling 10 is torqued onto the end of a length of pipe threads are cut into the outer surface of the length of pipe by threads 24. The gradual increase in the height of threads 24 after the bells minimizes the initial torques required to turn the coupling on the lengths of pipe or to turn the lengths of pipe inside the coupling, whichever is the case. This allows assembly of the joint to be started by hand. Normally, joint assembly is started by hand to verify proper alignment of the lengths of pipe in the coupling and then finished with the use of a pipe wrench or strap wrench.

Preferably, the full height of threads 24 is about 0.11 inches. The valleys between the threads are at the same diameter as the bells, about 0.055 inches larger than the maximum outer diameter of the lengths of pipe to be inserted into the coupling. Thus, the maximum depth that threads 24 will cut into the outer surface of the lengths of pipe will be about 0.0825 inches. This means that space is available at the bottom of the thread valleys to receive the material abraded from the outer surface of the lengths of pipe so that no binding will occur. The abrasion of the outer surface of the lengths of pipe exerts only low normal forces on the lengths of pipe so problems with collapsing the end of a length of pipe are not encountered.

A mechanical connection is made between the threads on the coupling and the outer surfaces of lengths of pipe 12 and 14. To seal the joint, however, it is presently preferred to spread an adhesive on the internal surface of wall 16 and/or on the outer surfaces of the lengths of pipe prior to assembly of the joint. The joint can be assembled using pipe dope or sealing compound to seal the joint. It is estimated that about 75% of the ultimate shear strength in the joint is provided by the mechanical connection achieved by the threads. Therefore, the joint is not sensitive to and will not be damaged by movement before the adhesive is cured. In addition, the make up of the adhesive is not as critical as it would be with other bonded joints because the adhesive is not as critical to the shear strength of the joint. Thus, specialized adhesives that do not provide good shear strength, such as conductive adhesives used to provide a path from pipe to ground for static electricity, can be used more freely with this type of joint.

The joint formed by abrasive threaded coupling 10 is a "no shave" joint that does not require any surface preparation of the lengths of pipe being joined. Therefore, no specialized tools are required in the field to assemble the joint. This joint is also a bonded joint so it does not need an O-ring to prevent leaking. The material displacement involved in assembly of the joint prevents air from being trapped in the adhesive. Problems with surface contamination are also reduced because a fresh surface is cut by the abrading action of threads 24.

Figure 2:
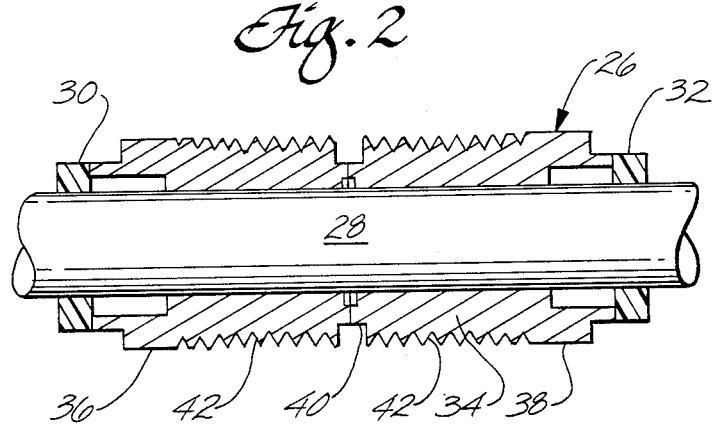
FIG. 2 is a cross-sectional side view of a threaded die used to make the coupling of FIG. 1 mounted on a mandrel.

With reference to FIG. 2, a threaded die 26 that can be used to make a coupling according to the present invention is shown mounted on an elongated, cylindrical mandrel 28. Means (not shown) are provided for rotating mandrel 28 about its longitudinal axis. Normally, die 26 would be mounted on the mandrel side by side with other dies. Die 26 would be separated from these other dies by cut-off rings 30 and 32 mounted on mandrel 28, one adjacent each end of die 26. Rings 30 and 32 are preferably made of polypropylene. The preferred material of construction for die 26 is 1018 steel. Die 26 separates into two parts at its mid point to facilitate its removal from the coupling that is formed on it.

Die 26 is primarily comprised of a cylindrical sleeve 34 that encircles mandrel 28. The outwardly facing surface of sleeve 34 is provided with a contour that is the negative image of the internal surface of wall 16 of coupling 10. Thus, it has smooth cylindrical surfaces 36 and 38 adjacent the ends of the die for forming bells 18 and 20, respectively, it has an indentation 40 extending about the circumference of the die at the mid point for forming pipe stop 22, and, between smooth cylindrical surfaces 36 and 38 and indentation 40, it has threads 42 for forming threads 24 of the coupling.

Figure 3:
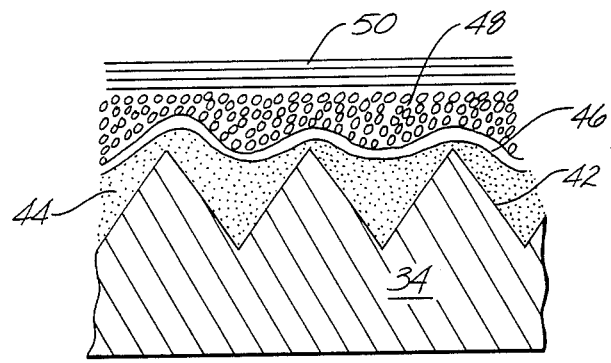
FIG. 3 is an enlarged, cross-sectional side view of a fragment of the threaded die of FIG. 2 with the components used to make the coupling of FIG. 1 shown schematically above the die.

With reference to FIG. 3, a close-up of a section of sleeve 34 having threads 42 on the outwardly facing surface is shown. Above threads 42, the layers used to build up a coupling on dies 26 are schematically depicted. While die 26 is rotated about its longitudinal axis, a mixture of grit and resin 44 is spread over the die to fill threads 42. The grit and the resin are preferably mixed in a ratio of about 4 to 1 by weight, respectively. For a coupling to be used with fiberglass reinforced pipe, the presently preferred grit is aluminum oxide, the same grit used in sandblasting machines, and the presently preferred resin is the same resin normally used to coat the fiberglass windings in making fiberglass reinforced pipe. However, the grit and resin used to from the abrasive threads can change depending on the type of pipe the coupling is to be used with. The grit chosen has to be harder than the material making up the pipe to be joined using the coupling so that threads 24 can abrade the surface of the pipe. Any means can be used to keep the grit molded into the form of threads that is compatible with the service the coupling is to be used in.

Next, polyester cloth 46 is wrapped over the grit and resin mixture. The presently preferred polyester cloth is sold under the trademark Nexus. Cloth 46 forms a containment barrier over mixture 44 that prevents grit from migrating up into the windings used to form the wall of the coupling. Then, a roving band of resin coated fiberglass filaments 48 is preferably wound over cloth 46 at nearly 90° to the longitudinal axis of mandrel 28 to compress mixture 44 into the valleys of threads 42. The angle of wind should be equal to the arc tangent of one thread pitch divided by one diameter of the die. Winding at this angle will keep the roving band over the valleys 20 of threads 42.

Finally, the wall of coupling 10 is built up in a conventional manner by applying windings of resin coated fiberglass filaments 50. A conventional reinforcing structure can be built up over cloth 46 directly, but the nearly 90° windings are preferred to more effectively ensure that mixture 44 has been compressed into the valleys of threads 42. This reduces the number of voids present in threads 24 formed by mixture 44. After the nearly 90° windings have been applied, the remainder of the coupling wall is normally built up using a reciprocal winding process.

A number of couplings can be made side by side on mandrel 28. After the wall of the couplings has been built up and the resin cured, the dies are slid off the end of mandrel 28 and cuts made through the reinforcing structure by sawing, or the like, at the points where cutoff rings are located to separate the couplings from one another. The ends of each coupling are finished and then the dies are removed from inside each coupling by threading out one half of each die from one side of each coupling and the other half of each die from the other side of each coupling. Any flashing present inside the couplings at their mid points is removed and then the couplings are ready to be used.

The preferred embodiment of the present invention described above is primarily intended to be used in a bonded joint, i.e., a joint using an adhesive that cures to bond the joint together. The above-described coupling could be used with just pipe dope so that the joint can be disassembled and the coupling reused but the joint formed would not maintain a seal at high pressures, i.e., above 2000 psi. However, an alternate embodiment of the abovedescribed coupling can be used as a reusable coupling that will maintain a seal at high pressures. Rather than having a gradual thread run in like that shown in FIG. 4, this alternate embodiment has a thread configuration like that shown in FIG. 4A.

Figure 4A:
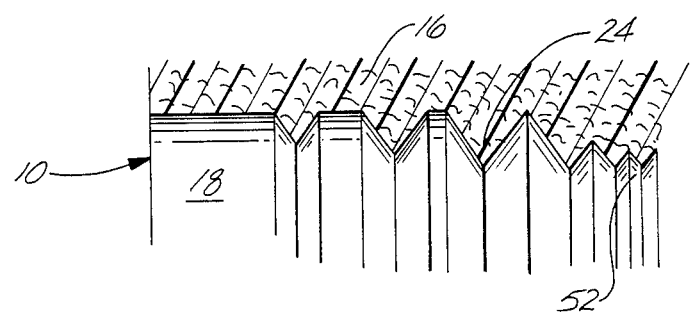
FIG. 4A is an enlarged, cross-sectional side view of a fragment of an alternate embodiment of the coupling of FIG. 1 showing a different thread make up.

In the alternate embodiment of FIG. 4A, the last few thread cycles have a shallow thread valley 52. This thread configuration makes it more difficult to thread the last few cycles but, at the shallow thread valleys, the spaces between the coupling and the outer surface of the length of pipe inserted into the coupling are eliminated. Thus, a tight seal is formed between the coupling and the length of pipe. A number of thread cycles can be provided with shallow valleys to improve the seal but care must be taken not to do this to so many thread cycles the coupling will bind while being torqued on.

Figure 5:
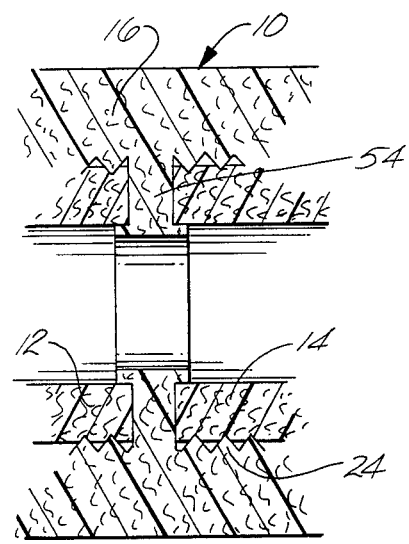
FIG. 5 is an enlarged, cross-sectional side view of a fragment of an alternate embodiment of the coupling of FIG. 1 showing a different pipe stop.

A further modification of coupling 10, shown in FIG. 5, can also help the coupling to maintain a seal at high pressures. In this alternate embodiment, pipe stop 22 is replaced by a projection 54 having a T-shaped cross section. Projection 54 extends down and over the ends of the lengths of pipe inserted into the coupling. This provides a seal at the ends of the lengths of pipe. This modification can be used in combination with the modification of thread configuration illustrated by FIG. 4A.

Figure 6:
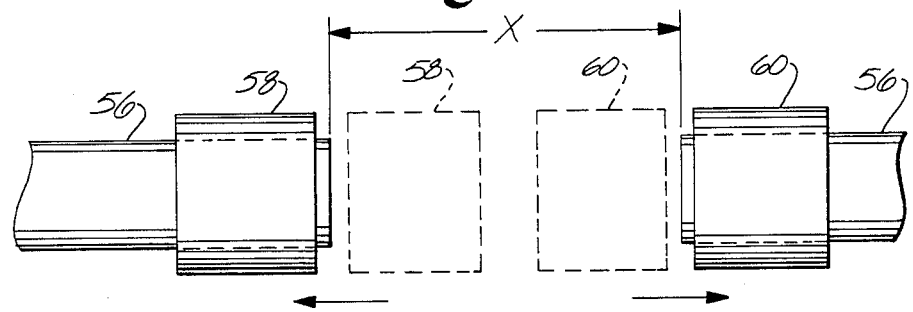
FIG. 6 is a schematic side view of a pipeline having a section removed for repair.

With reference to FIG. 6, an existing pipeline 56 is shown that has had a length X removed from the pipeline. To repair the pipeline, a pair of couplings 58 and 60 are torqued onto the opposing pipe ends formed by the removal of length X. Couplings 58 and 60 are the same as coupling 10 described above except that they have no pipe stop or projection at their mid point. Instead, threads 24 extend across the length of the coupling between the bells. Thus, couplings 58 and 60 can be threaded completely onto the opposing pipe ends as shown in FIG. 6.

Figure 6A:
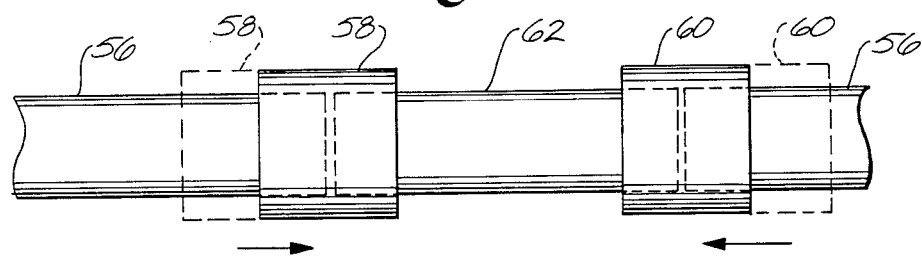
FIG. 6A is a schematic side view of the pipeline of FIG. 6 with a replacement section joined to the pipeline with a pair of couplings made according to the present invention without pipe stops.

A joining pipe 62 having a length X is aligned with pipeline 56 between the opposing ends once couplings 58 and 60 have been threaded onto the pipeline (FIG. 6A). Then, couplings 58 and 60 are backed off of the opposing ends of the pipeline and threaded onto the ends of joining pipe 62 until the couplings straddle the points where joining pipe 62 meets the pipeline. Care should be taken to center the coupling over these meeting points. The only surface preparation needed before using the couplings to repair the pipeline is the application of adhesive if bonded joints are desired. Thus, the coupling of the present invention can be modified slightly to be used as a quick and effective repair coupling. The threads cut into the pipeline that are exposed when the repair couplings are backed off should not adversely impact on the bursting strength of the pipeline because they are very shallow in comparison to the wall thickness of most pipe.

What is claimed is:

1. A fitting for attachment to a length of pipe having an internal and an external surface, comprising:
    a sleeve member having an internal and an external surface and at least one end separating these surfaces; and
    self tapping threads comprised of a grit and resin mixture and provided in at least a portion of one of the surfaces of the sleeve member for engaging at least a portion of one of the surfaces of the length of pipe when the fitting is attached to the length of pipe, said threads adapted to abrade material from and thereby form threads in the portion of the pipe surface engaged during attachment.

2. A fitting according to claim 1 wherein the surface of the sleeve member in which the self tapping threads are provided is smooth adjacent the one end to assist in the alignment of the fitting to the length of pipe.

3. A fitting according to claim 1 wherein the surface of the sleeve member in which the self tapping threads are provided has a rib extending radially therefrom at a point on said surface that is on the opposite side of the threads from the one end to control the degree of engagement between the fitting and the pipe length.

4. A fitting according to claim 1 wherein the height the thread gradually increases to a constant height for the remaining threads as the threads are located farther away from the one end in the surface in which they are provided.

5. A fitting according to claim 4 wherein the height of the threads increases to a constant height over about 2½ thread cycles.

6. A fitting according to claim 1 wherein the grit and the resin are mixed in a ratio of about 4 to 1 by weight, respectively.

7. A fitting according to claim 1 wherein the length of pipe is comprised of reinforced fiberglass, the grit is comprised of aluminum oxide and the resin is . comprised of a similar resin as the pipe.

8. A fitting according to claim 1 wherein the self tapping threads are provided in the internal surface of the sleeve to engage the external surface of the length of pipe when the fitting is attached to the length of pipe.

9. A fitting according to claim 1 wherein the self tapping threads are provided in the external surface of the sleeve to engage the internal surface of the length of pipe when the fitting is attached to the length of pipe.

10. A method for attaching a fitting to a length of pipe, comprising the steps of:
   providing self tapping threads comprised of a grit and resin mixture in at least a portion of a surface of the fitting; and
   bringing the self tapping threads into contact with a surface of the length of pipe so that threads are abraded into the surface of the length of pipe.

11. A method according to claim 10 also comprising the step of spreading an adhesive material on the self tapping threads and the surface of the length of pipe before bringing the abrasive threads into contact with the surface of the length of pipe.

12. A method for joining at least two lengths of pipe together at a fitting, comprising the steps of:
   providing self tapping threads comprised of a grit and resin mixture of the fitting surface; and
   bringing portions of the self tapping threads into contact with surfaces of the lengths of pipe so that threads are abraded into the surfaces of the lengths of pipe.

13. A method according to claim 12 also comprising the step of spreading an adhesive material on the self tapping threads and the surfaces of the lengths of pipe before bringing portions of the self tapping threads into contact with the surfaces of the lengths of pipe.

* * * * *

UNITED STATES PATENT AND TRADEMARK OFFICE
CERTIFICATE OF CORRECTION

PATENT NO. : 4,875,710
DATED : October 24, 1989
INVENTOR(S) : Hector P. Mercado

It is certified that error appears in the above-identified patent and that said Letters Patent is hereby corrected as shown below:

Column 7, line 9, after "valleys" delete "20".
Column 7, line 42, change "abovedescribed" to -- above-described --.

Column 8, line 52, after "height" insert -- of --.

Column 10, line 1, change "abrasive" to -- self tapping --.

Column 10, line 6, after "mixture" insert -- in at least a portion --.

Signed and Sealed this

Fourth Day of February, 1992

Attest:

HARRY F. MANBECK, JR.

*Attesting Officer*  *Commissioner of Patents and Trademarks*